United States Patent [19]

Ueno

[11] Patent Number: 5,465,305
[45] Date of Patent: Nov. 7, 1995

[54] CHARACTER RECOGNITION METHOD AND APPARATUS FOR PREPARING A PLURALITY OF CHARACTER RECOGNITION PROCESSES IN PARALLEL

[75] Inventor: Shugoro Ueno, Tokyo, Japan

[73] Assignee: Canon Kabushiki Kaisha, Tokyo, Japan

[21] Appl. No.: 235,150

[22] Filed: Apr. 28, 1994

Related U.S. Application Data

[63] Continuation of Ser. No. 970,185, Nov. 2, 1992, abandoned.

[30] Foreign Application Priority Data

Nov. 8, 1991 [JP] Japan ..................... 3-292650

[51] Int. Cl.⁶ .................................. G06K 9/64
[52] U.S. Cl. .......................... 382/218; 382/304
[58] Field of Search ...................... 382/30, 49, 62, 382/59, 38, 9, 10, 34; 364/228.1, 244.8

[56] References Cited

U.S. PATENT DOCUMENTS

| | | | |
|---|---|---|---|
| 3,988,715 | 10/1976 | Mullan et al. | 382/40 |
| 4,429,414 | 1/1984 | Asakawa | 382/30 |
| 4,498,189 | 2/1985 | Mori | 382/30 |
| 4,787,065 | 11/1988 | Barazesh et al. | 364/900 |
| 4,975,974 | 12/1990 | Nishijima et al. | 382/30 |
| 5,136,662 | 8/1992 | Maruyama et al. | 382/49 |
| 5,140,538 | 8/1992 | Bass et al. | 382/30 |
| 5,257,323 | 10/1993 | Melen et al. | 382/10 |

FOREIGN PATENT DOCUMENTS

| | | |
|---|---|---|
| 115174 | 4/1980 | Japan . |
| 55-115174 | 9/1980 | Japan . |
| 58-56911 | 12/1983 | Japan . |
| 2173699 | 7/1990 | Japan . |
| 3149961 | 7/1991 | Japan . |

OTHER PUBLICATIONS

Clapper, G. L., "Pattern Recognition with Threshold Release Circuit," *IBM Technical Disclosure Bulletin*, vol. 14, No. 2, pp. 493–494 (Jul. 1971).

Primary Examiner—Joseph Mancuso
Assistant Examiner—Larry J. Prikockis
Attorney, Agent, or Firm—Fitzpatrick, Cella, Harper & Scinto

[57] ABSTRACT

A character recognition method and apparatus realizes high-speed character recognition by using small capacity memories. A character in an original image is read as an input character pattern in an image input process. An n-th calculator 109 in a similarity calculation unit 6 inputs the input character pattern into an input pattern memory 110 and compares the input character pattern with a standard character pattern ($\phi_m$: m=0,M) stored in a dictionary memory 101 sequentially, thus calculating similarities between the input character pattern and the respective standard character patterns. If a CPU 1 issues a similarity calculation request instruction while an n-th calculator 109 is operating, another one of the calculators in a standby status is used so that another similarity calculation can be performed while simultaneously avoiding access conflict in the memory 101.

11 Claims, 10 Drawing Sheets

CHARACTER RECOGNITION METHOD AND APPARATUS FOR PREPARING A PLURALITY OF CHARACTER RECOGNITION PROCESSES IN PARALLEL

This application is a continuation of application Ser. No. 07/970,185 filed Nov. 2, 1992, now abandoned.

BACKGROUND OF THE INVENTION

The present invention relates to a character recognition method and apparatus, and more particularly, to a character recognition method and apparatus for calculating similarity between an input pattern and standard patterns.

A typical conventional character recognition apparatus such as an OCR (Optical Character Reader) optically reads a character and converts the read data into a character pattern (input pattern). A pattern similarity calculation circuit incorporated in the apparatus calculates the similarity between the character pattern and standard patterns stored in an internal dictionary. The apparatus outputs a standard pattern having the highest similarity in the calculation results as a recognition result. Usually, the pattern similarity calculation circuit requires a plurality of nonvolatile memories in order to raise the process speed. A standard pattern data for one character is divided into a plurality of portions and stored into these memories as described in Japanese Patent Publication (Kokoku) No. 58-56911. The data from the memories are latched into the pattern similarity calculation circuit, which selectively outputs data by a predetermined number of bits.

Figure 8:
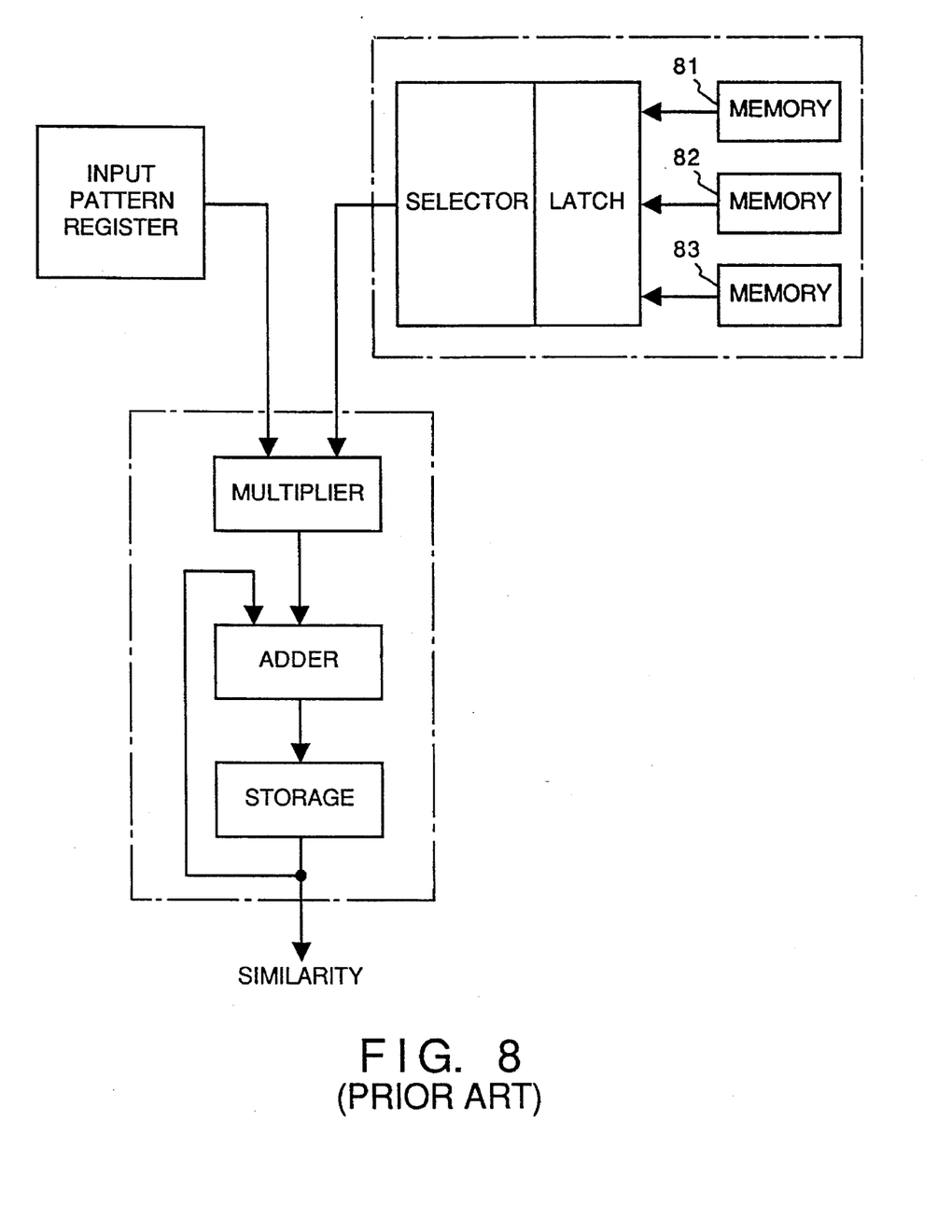
FIG. 8 is a block diagram showing a construction of a conventional (prior art) type of similarity calculation unit.

FIG. 8 shows a configuration of a pattern similarity calculation circuit according to the conventional character recognition apparatus, in which standard pattern data for one character is discretely stored into a plurality of memories. According to FIG. 8, the standard pattern data for one character is divided into 9 segments ($\phi_{N1}$–$\phi_{N9}$) and stored in the memories 81 to 83. More specifically, $\phi_{N1}$, $\phi_{N4}$ and $\phi_{N7}$ are stored in the memory 81; $\phi_{N2}$, $\phi_{N5}$ and $\phi_{N8}$, in the memory 82; and $\phi_{N3}$, $\phi_{N6}$ and $\phi_{N9}$, in the memory 83.

However, the above conventional character recognition apparatus has the following drawbacks:
(1) The number of memories will increase as calculation speed becomes higher. This results in raising the cost of memory packaging.
(2) If the input speed of an input pattern exceeds the calculation speed of the pattern similarity calculation circuit, the input pattern has to queue up to be calculated. For this reason, in order to control the input speed and input timing, a circuit for controlling the input speed must be added. Accordingly, the total throughput is limited by the input speed.
(3) In the case where a standard pattern in a specific address area in a ROM where the dictionary is stored is used, e.g., in a dictionary ROM in which Chinese characters, alphabets and numerals are stored, numerals are required for recognition but the corresponding address area is being accessed, the process must wait for the termination of the current process accessing the address area, causing time loss.
(4) If calculation is performed using a different similarity calculation algorithm, the current algorithm for driving the calculation circuit must be changed. This prolongs the processing time.

SUMMARY OF THE INVENTION

Accordingly, it is an object of the present invention to provide a character recognition method which prevents an increase of necessary memory capacity and improves total throughput.

According to the present invention, the foregoing object is attained by providing a character recognition method for reading a character in an original image, comparing the read character with standard character patterns stored in a storage medium and performing character recognition, comprising an input step of reading the character in the original image, a character recognition step of comparing an access start address in a plurality of calculation circuits for access to the storage medium with an address of one standard character pattern, reading out the standard character pattern from the storage medium, comparing the read character with the read standard character pattern, and performing recognition of the read character using the plurality of calculation circuits, and an output step of outputting a character recognized in said character recognition step.

It is another object of the present invention to provide a character recognition apparatus which prevents an increase of necessary memory capacity and improves total throughput.

According to the present invention, the foregoing object is attained by providing a character recognition apparatus for reading a character in an original image, comparing the read character with standard character patterns stored in a storage means and performing character recognition, comprising input means for inputting the character in the original image, a plurality of calculation means for reading out one standard character pattern stored in said storage means, comparing the standard character pattern with the character read by said input means and performing character recognition, management means for managing an access start address in said plurality of calculation means for access to said storage means, and output means for outputting a character recognized by said calculation means.

In accordance with the present invention as described above, the apparatus performs character recognition of a character in an original image by managing access start addresses in a plurality of calculation means for access to storage media and using the plurality of calculation means.

In other words, the character recognition of a character of the original image is performed by managing access to storage media in which standard character patterns are stored based of access start addresses and by using the plurality of calculation means.

The invention is particularly advantageous since the recognition processes are sequentially started in accordance with calculation requests, realizing a smooth character recognition in which process waiting status does not occur even though input speed of a character is fast. Further, high-speed total throughput can be attained.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS.

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Figure 1:
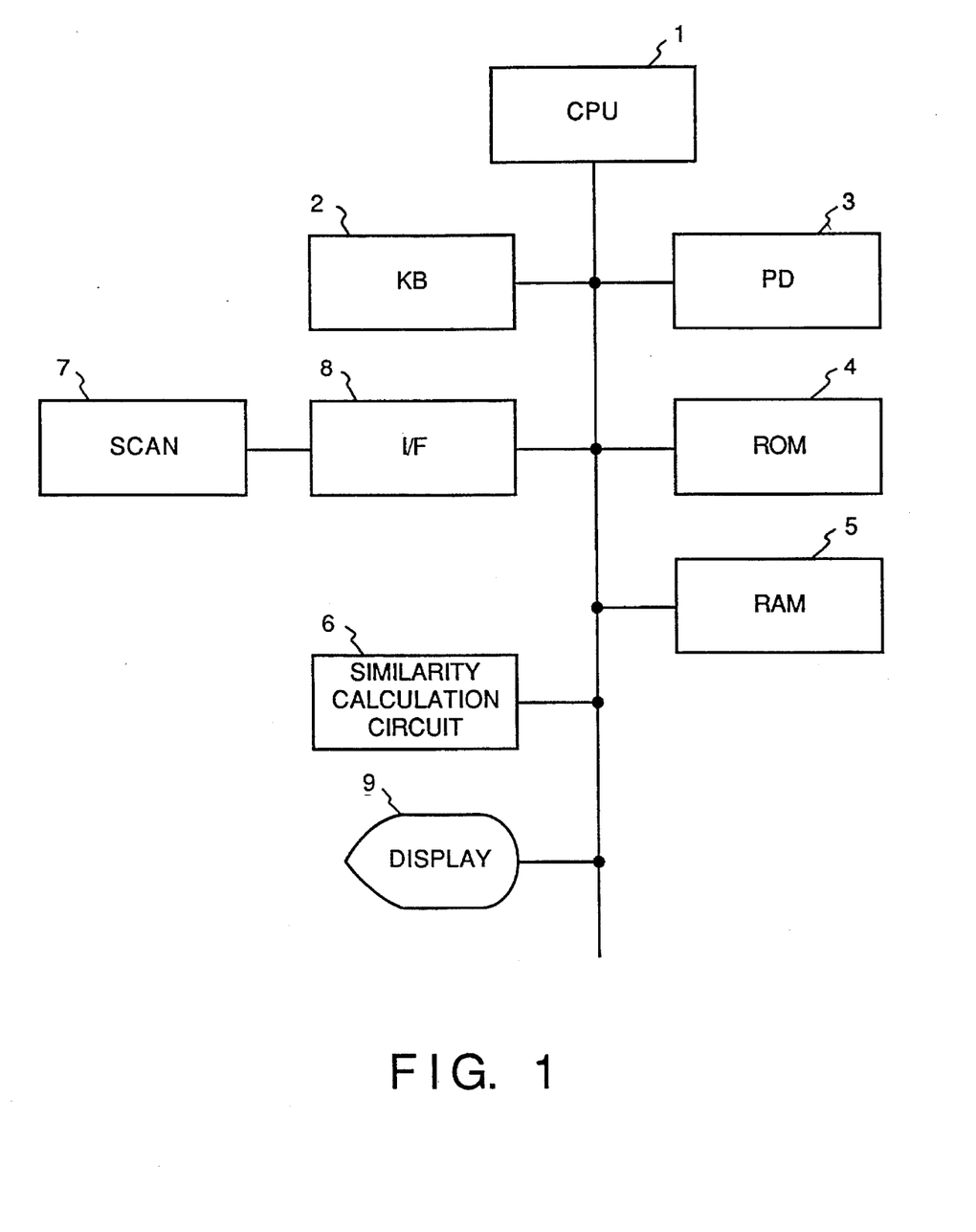
FIG. 1 is a block diagram showing a configuration of a character recognition apparatus embodying the present invention.

Configuration of the Apparatus (FIG. 1)

FIG. 1 shows a configuration of a character recognition apparatus embodying the present invention. In FIG. 1, reference numeral 1 denotes a CPU which controls the overall apparatus and controls processes such as input of an image and segmentation of a character image; 2, a keyboard (KB) for inputting a character and for performing collection of the input character; 3, a pointing device (PD) such as a mouse; 4, a ROM in which programs executed by the CPU 1 are stored; 5, a RAM in which a character image, segmentation results and recognition results and the like are stored; 6, a similarity calculation unit which calculates similarity between a character image and respective standard patterns; 7, an image scanner (SCAN) which reads images; 8, an interface (I/F) of the image scanner 7; and 9, a display for displaying such as character recognition results.

Figure 2A:
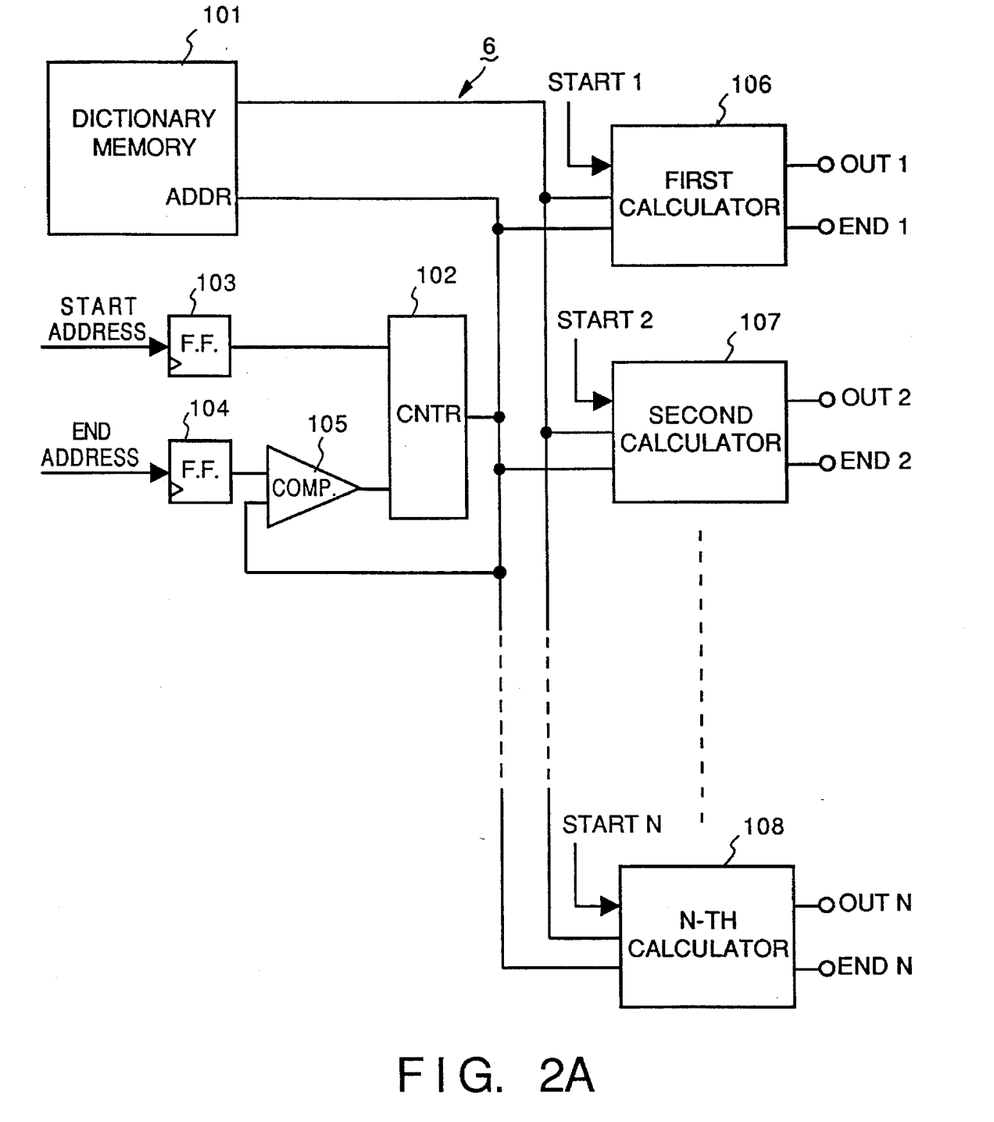
FIGS. 2A and 2B are block diagrams showing in detail a construction of a similarity calculation unit 6.
Figure 2B:
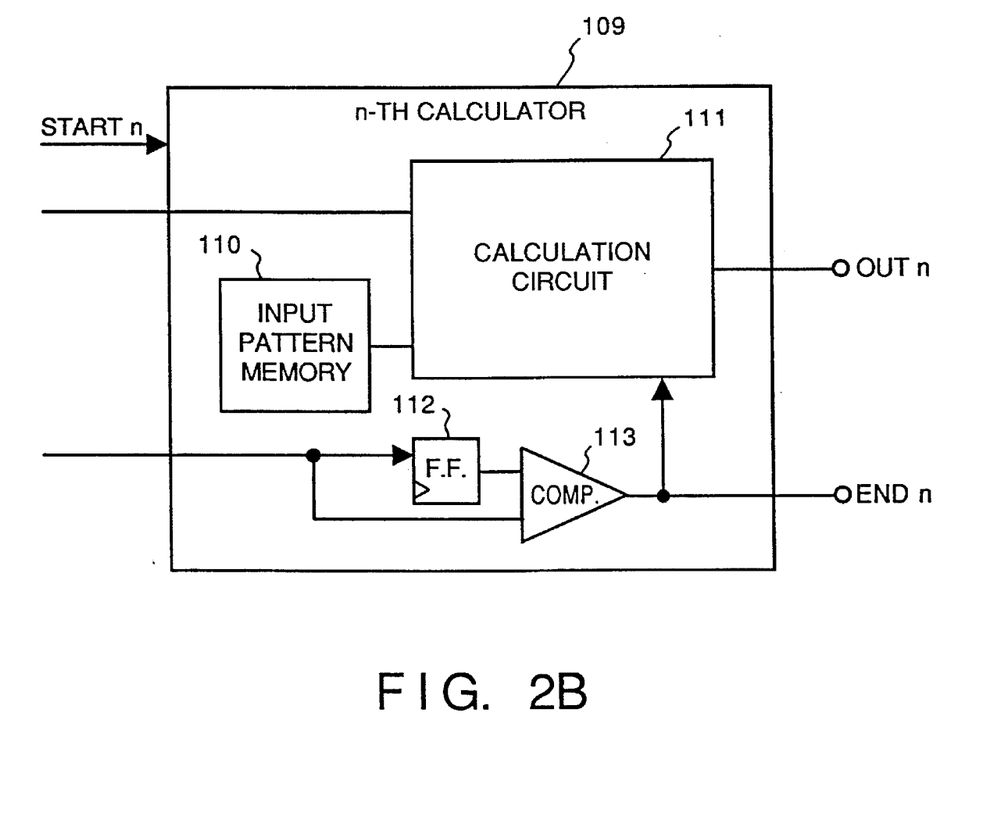

Construction of Similarity Calculation Unit 6 (FIG. 2)

FIGS. 2A and 2B show a construction of the similarity calculation unit 6, which is the most significant part of this embodiment. In FIG. 2A, reference numeral 101 denotes a dictionary memory in which standard patterns are stored. In this embodiment, the dictionary memory 101 is a ROM, however, a RAM can be employed for the ROM. In such case, a standard pattern is loaded from an external auxiliary storage unit. Numeral 102 denotes a counter for access to the dictionary memory 101. The counter 102 is connected to an address line of the dictionary memory 101. Numeral 103 denotes a flip-flop register in which a start address from the counter 102 is stored. Numeral 104 denotes a flip-flop register in which an end address from the counter 102 is stored. Numeral 105 denotes a comparator which determines whether an output from the counter 102 coincides with an end address set in the register 104. If the output from the counter 102 coincides with the end address, the content of the register 103 is loaded in the counter 102. Numeral 106 denotes a first calculator; 107, a second calculator; and 108, an N-th calculator.

The calculators respectively have a construction as shown in FIG. 2B. More specifically, an n-th calculator 109 (n=1, N) comprises an input pattern memory 110, a calculation circuit 111 which compares data from the input pattern memory 110 with data from the dictionary memory 101 and calculates similarity between the data, a flip-flop latch 112 and a comparator 113 which compares an output from the latch 112 with an output from the counter 102 and terminates the process by the calculation circuit 111 if the two signals coincide.

Figure 3:
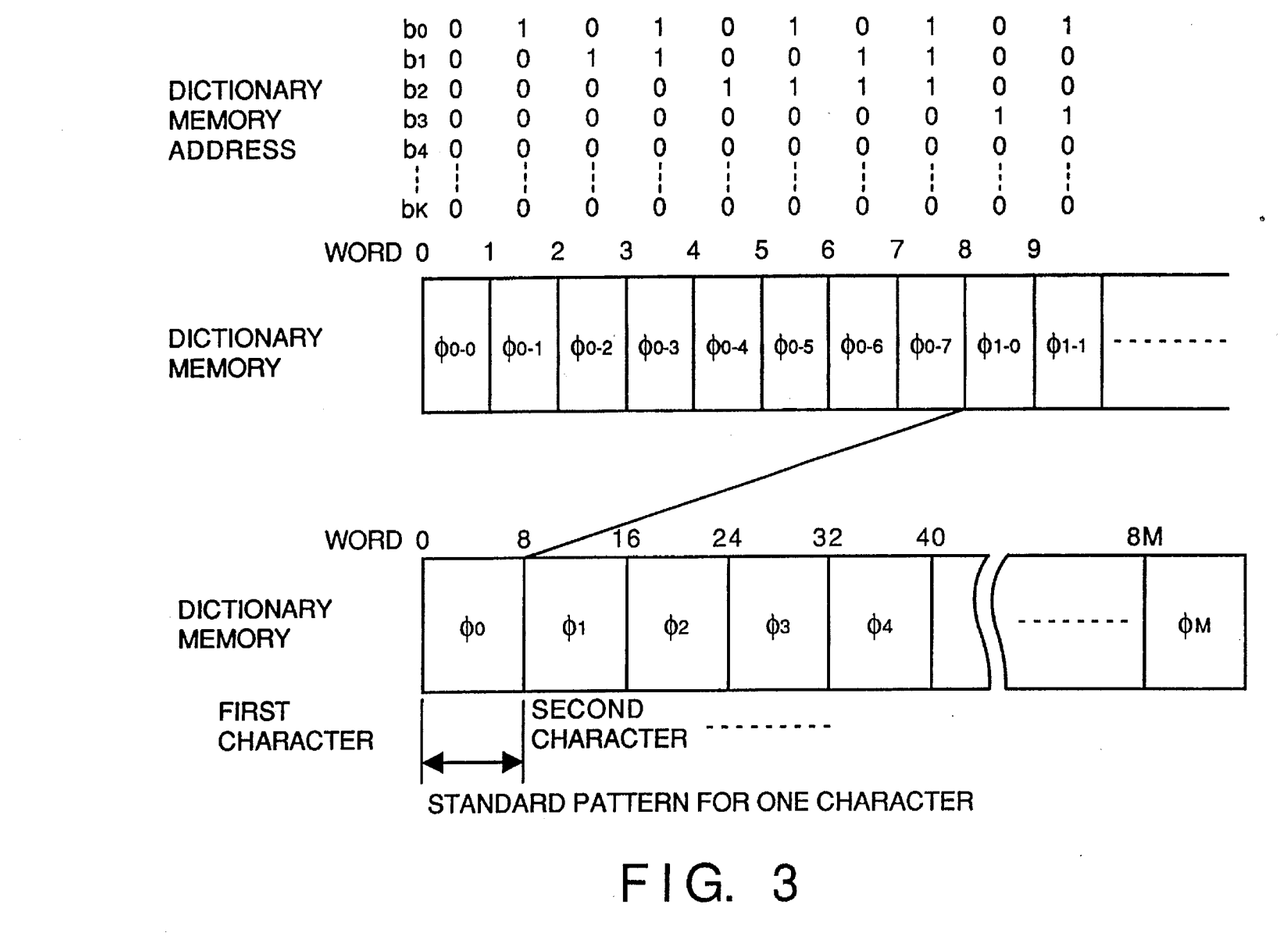
FIG. 3 is a diagram showing an internal structure of a dictionary memory.
Figure 4A:
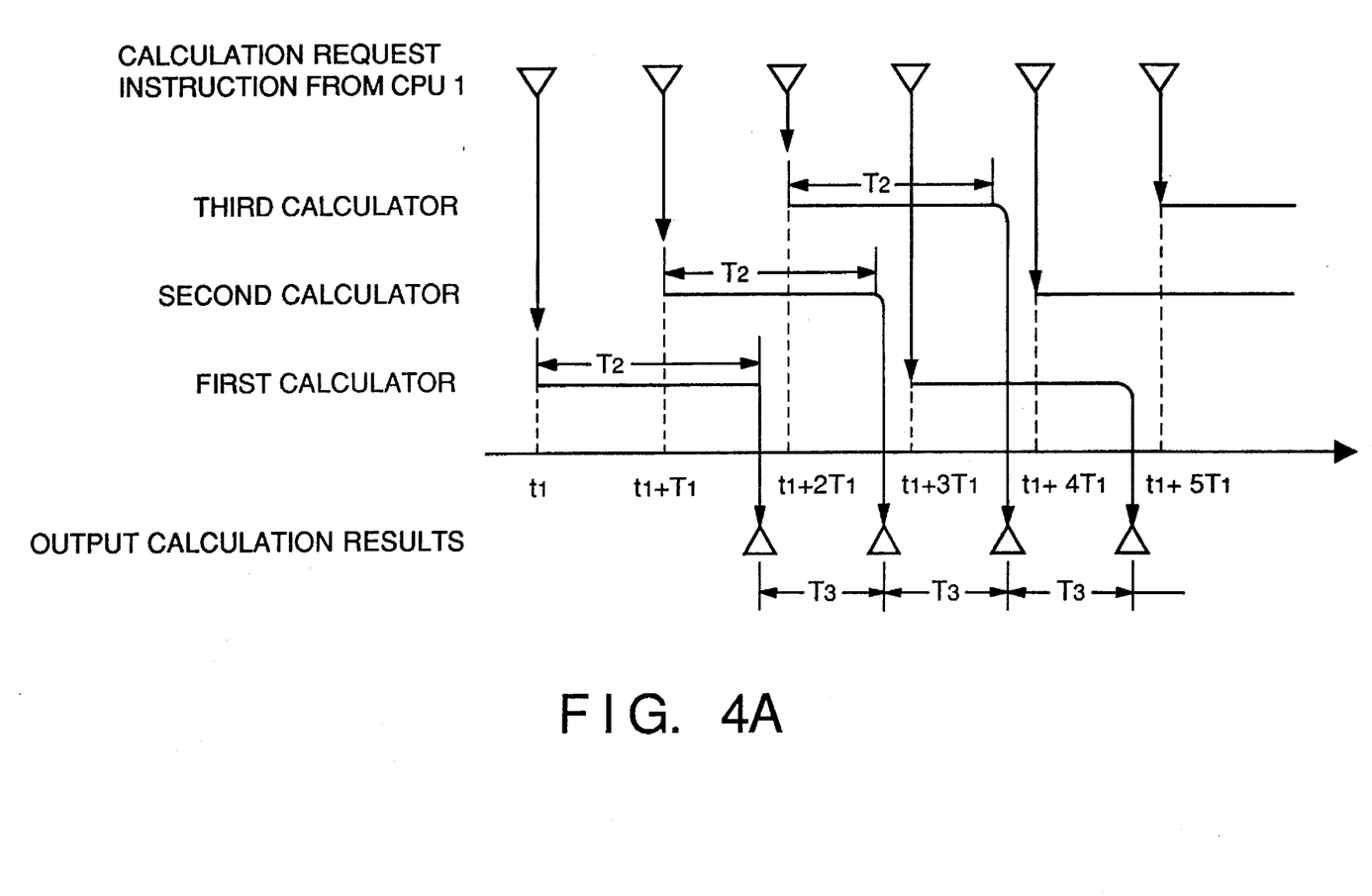
FIG. 4A is a time chart showing a total throughput of a pattern similarity calculation.
Figure 4B:
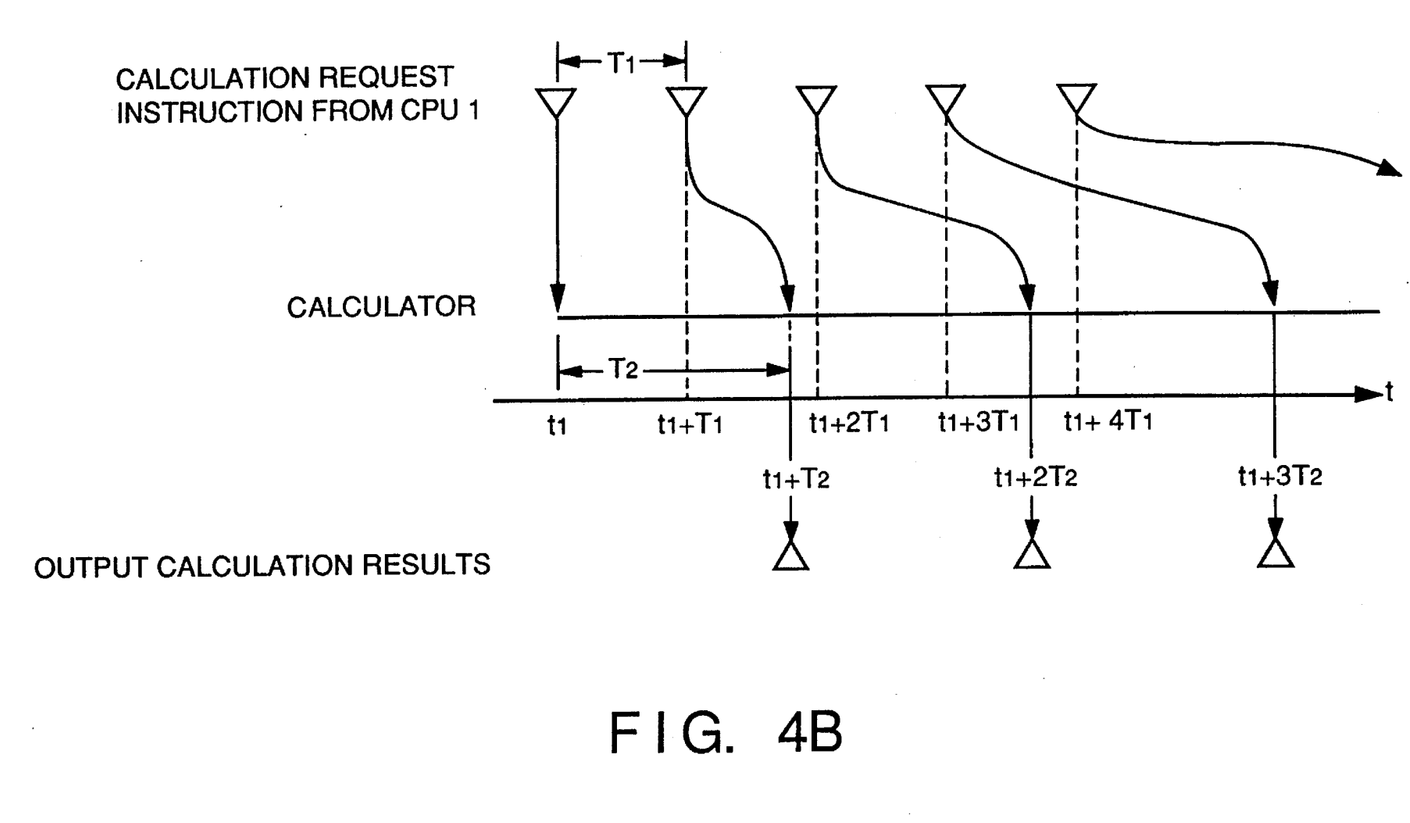
FIG. 4B is a time chart showing a total throughput of a conventional pattern similarity calculation.
Figure 5:
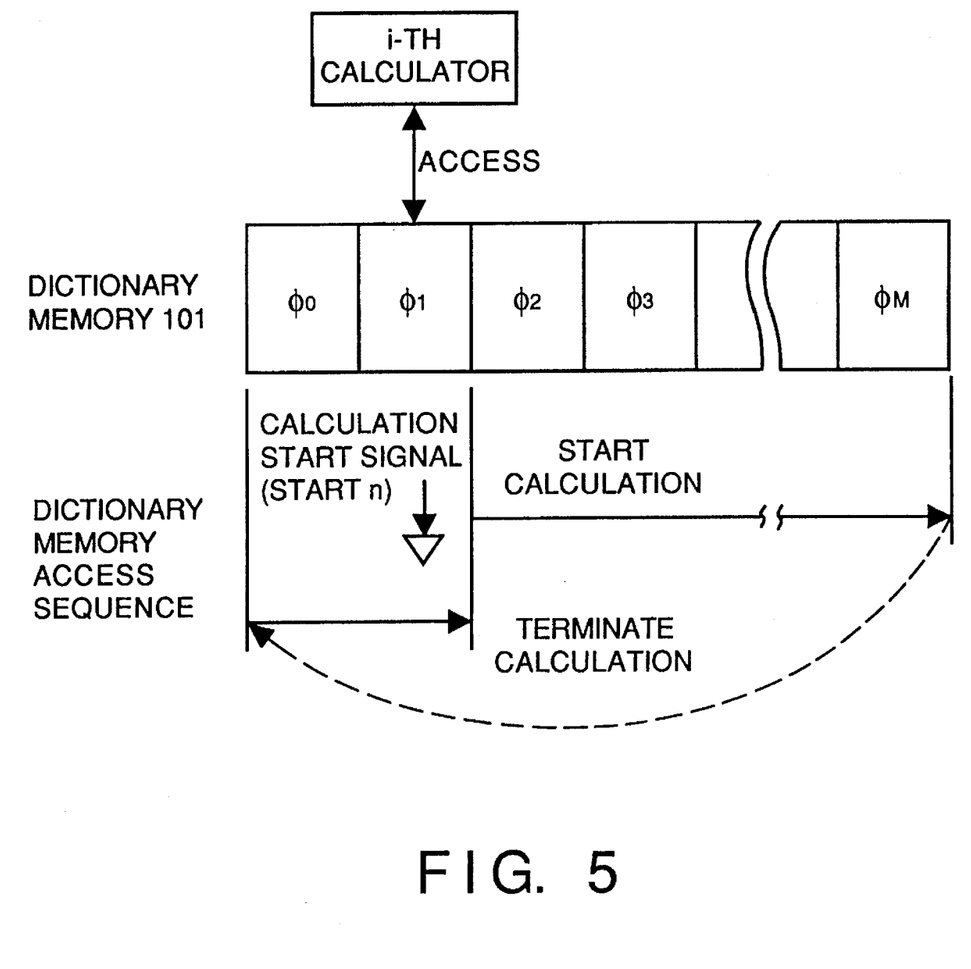
FIG. 5 is a diagram showing an access sequence of the dictionary memory in the case where a calculation start signal is input during access of the dictionary memory.

Operation of Similarity Calculation Unit 6 (FIGS. 3 to 5)

The operations of the similarity calculation unit 6 having the above construction are as follows on the condition that standard patterns have been stored in the dictionary memory 101 in advance:

(1) An access start address is sent to the register 103, an access end address is sent to the register 104 and the content of the register 103 is loaded onto the counter 102 for access to the dictionary memory 101. Access addresses are start addresses of the respective standard patterns stored in the dictionary memory 101. These addresses are counted up every time a standard pattern to be the object of similarity calculation is changed. FIG. 3 illustrates storage addresses in case where a standard pattern is stored into the dictionary memory 101. In this embodiment, a standard pattern for one character ($\phi_{n_i} = 0, M$) consists of eight words, written by one-character unit. More specifically, if the data of standard patterns are continuously stored in the memory, an access address is counted up by eight words every time a standard pattern for one character is changed. The respective standard pattern have a dictionary memory address ($b_0, b_1, b_2 \ldots b_k$) for one word accessible by one-word unit. In this embodiment, as a standard pattern for one character consists of 8 words, lower three bits ($b_0, b_1$ and $b_2$) of the respective dictionary memory address mean an address for access of a standard pattern for one character, and $b_3, b_4 \ldots b_k$ of the memory address mean a start address for one character.

(2) When the CPU issues a pattern similarity calculation request instruction, an input pattern read by the SCAN 7 is sent to the input pattern memory 110 and the first calculator 106 is activated by a calculation start signal START 1.

(3) Upon inputting of the START 1 into the first calculator 106, an output value from the counter 102 at that time is set to the latch 112 and the calculation circuit 111 is activated. The output value from the counter 102 is a standard pattern address to be the object of the similarity calculation, i.e., a dictionary memory address.

(4) The calculation circuit 111 performs the calculation of similarity between the input pattern stored in the input pattern memory 110 and the standard patterns stored in the dictionary memory 101. Every time the calculation circuit 111 performs calculation for one pattern, the counter 102 counts up by +8. When output from the counter 102 reaches a value indicative of the end address stored in the register 104, the comparator 105 starts to re-load the start address stored in the register 103 onto the counter 102 which cyclically repeats the count-up operation until all the calculation start signals START n (n=1, N) become inactive.

(5) The calculation process by the first calculator 106 is terminated by a signal outputted from the comparator 113 to the calculation circuit 111 when an output value from the latch 112 and an output value from the counter 102 coincide. Further, the output from the comparator 113 is output as a signal END 1 to the first calculator 106 to notify the termination of the calculation process.

(6) In case where the CPU 1 issues a next pattern similarity calculation request while the calculation started by the calculation request issued in the operation (2) is being performed by the first calculator 106, the similarity calculation circuit 6 performs a next similarity calculation using one of the second to N-th calculators in a standby status according to a similar procedure described in (2) to (5).

FIG. 4A is a time chart showing a total throughput of the pattern similarity calculation. $T_1$ is an interval between the pattern similarity calculation request instructions issued by the CPU 1; $T_2$, similarity calculation time; and $T_3$, an interval between outputs of calculation results. As shown in FIG. 4A, it is possible to perform continuous calculation processes in response to the instruction from the CPU 1 if the following three conditions are satisfied:

① $2T_1 < T_2 < 3T_1$ (the similarity calculation is completed between the instructions from the CPU 1);

② $T_3 \approx T_1$ (the interval between the calculation request instructions and the interval between the outputs of calculation results are nearly equal);

③ N=3 (the number of the calculators is three).

In this case, a time period from a calculation request to output of the calculation results is always $T_2$.

Compared with FIG. 4B, showing a time chart of a conventional similarity calculation where the number of calculators is only one, it is apparent from FIG. 4A that there is no execution-waiting and that the total throughput is apparently raised.

The improvement of the total throughput in this embodiment will be described in detail from the point of memory access conflict with reference to FIG. 5 showing a relationship between activation/deactivation of the calculation unit 6 and access to the dictionary memory 101.

In FIG. 5, the situation in which the dictionary memory 101 has been accessed and that a calculation start signal START n inputs an i-th calculator while the i-th calculator is calculating similarity between an input pattern and a standard pattern with respect to a second character ($\phi_1$) will be considered. The i-th calculator which received the START n latches a dictionary memory address ($b_3, b_4 \ldots b_k$) in the latch 112. It should be noted that "0" is set to the lower three bits ($b_0, b_1$ and $b_2$). The addresses to be latched are respectively $1, 0 \ldots 0$ with respect to $b_3, b_4 \ldots b_k$.

In this embodiment, if a latched address (in FIG. 5, the second character ($\phi_1$)) is an address of an accessed pattern in the dictionary memory, actual calculation starts from the first one of standard patterns for the next character (the third character ($\phi_2$) having addresses $0, 1 \ldots 0$ with respect to b3, b4 ... bk). More specifically, the calculation starts from the third character, then returns to the first character ($\phi_0$) through the last character ($\phi_M$) and ends at the second character ($\phi_1$). When the address of the character to be the last object of the calculation ($\phi_1$) is set, the comparator 113 becomes active and determines that the calculation process has cycled from the first character to the last character. The operation of the calculation circuit 111 stops at the point in time where the calculation for the second character ($\phi_1$) is completed (at the point in time where the output from the comparator 113 has changed from active to inactive).

As described above, by managing the addresses for starting the similarity calculation, even though a character from which the similarity calculation starts has to be shifted, the calculation unit is able to perform the similarity calculation by accessing all of the addresses in the dictionary, regardless of wherever the starting address is.

According to this embodiment, as the similarity calculation unit incorporates the plurality of calculators, it can avoid execution-waiting for a similarity calculation request instruction from the CPU. Further, even though an address for reading a standard pattern in the respective calculators is shifted, all the standard patterns in one storage medium can be accessed. Thus, faster similarity calculation can be performed.

Figure 6:
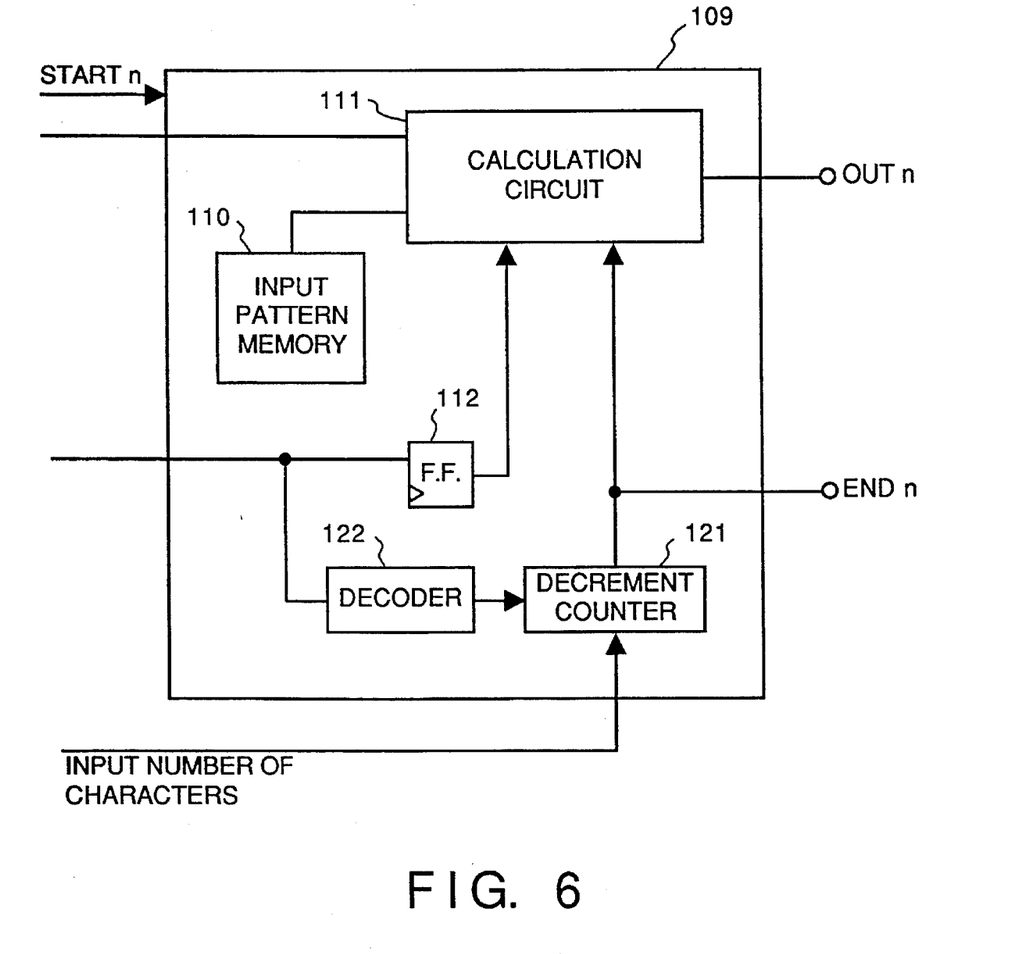
FIG. 6 is a diagram showing another construction of an n-th calculator.

It should be noted that in this embodiment, the comparator 113 is employed for determining whether the similarity calculation has been performed to the standard patterns in the dictionary memory 101 in a cyclic manner. However, the present invention is not limited to this arrangement. For example, as shown in FIG. 6, a decrement counter 121 in which a number of characters in the dictionary memory 101 is set and a decoder 122 which indicates termination of access to a standard pattern for one character may be combined. In this case, every time access to one standard pattern terminates, the decoder 122 decodes an access address in the dictionary memory 101 and generates a pulse signal, and the decrement counter 121 counts down the set number. When the counter value becomes zero, the calculation circuit 111 stops the calculation and the termination of the calculation is notified to the outside. Similar to the abovementioned embodiment, the latch 112 in FIG. 6 latches an address for access to the dictionary memory 101 and instructs the calculation circuit 111 to start the calculation upon input of a calculation start signal START n into the calculator 109.

In this embodiment, the range of addresses accessible to the standard patterns stored in the dictionary memory 101 is not limited, however, the present invention is not limited to this arrangement. For example, as shown in FIG. 7, it can be arranged such that the range of addresses accessible to the standard patterns in the dictionary memory 101 is designated in the respective calculators 109.

Figure 7:
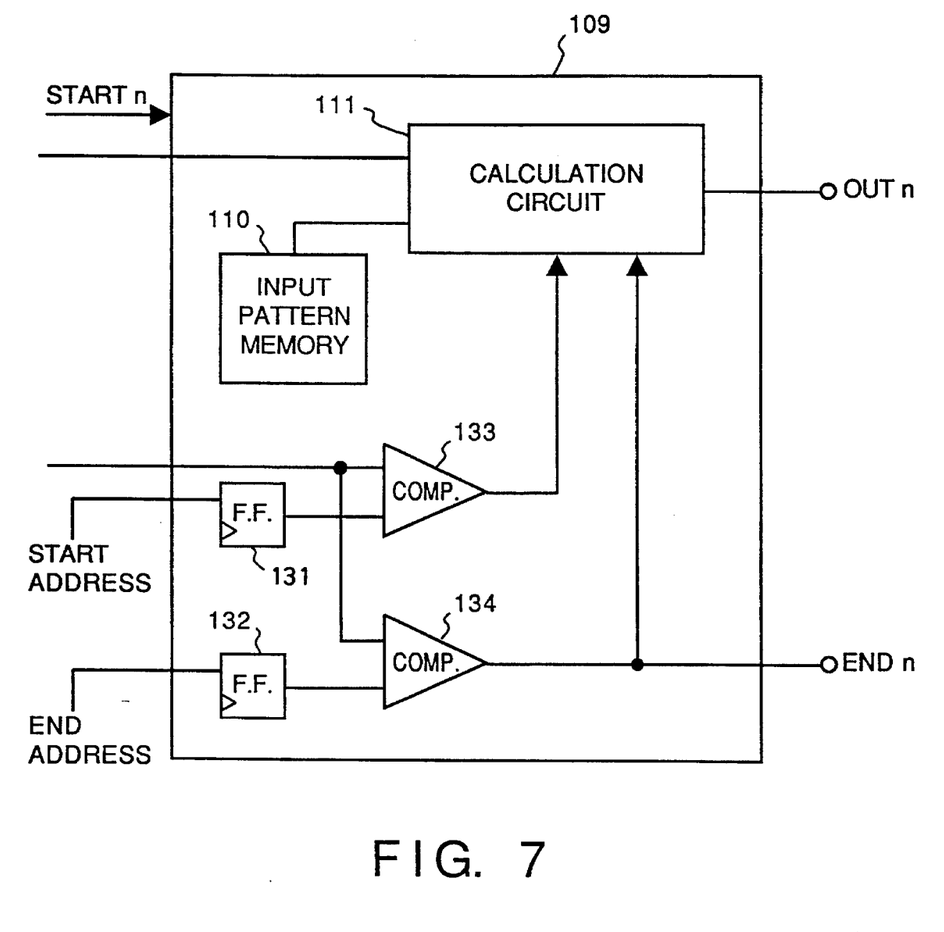
FIG. 7 is a diagram showing still another construction of the n-th calculator.

In FIG. 7, reference numeral 131 denotes a latch to which a start address of the dictionary memory 101 is set; 132, a latch to which a dictionary address of the dictionary memory 101 is set; and 133 and 134, comparators. The n-th calculator 109 refers the start addresses of the dictionary memory 101 at the calculation starting time and refers the end addresses of the dictionary memory 101 immediately before termination of the calculation. The comparator 133 determines whether an output value from the start address latch 131 coincides with output from the counter 102 for access to the dictionary memory 101. The calculation circuit 111 is started if a calculation start signal START n is active and the two inputs in the comparator 133 coincide. The comparator 134 determines whether an output value from the latch 132 coincides with an output from the counter 102 for access to the dictionary memory 101. When the two inputs in the comparator 134 coincide, the calculation circuit 111 terminates the calculation.

In the above example, an algorithm of the calculation by the calculation circuit 111 is not especially defined. However, it can be arranged in the present invention such that the respective calculators operate with different algorithms. In this arrangement, one input pattern can enter the plurality of calculators, and calculation results from the calculations in the different algorithms can be obtained.

The present invention can be applied to a system comprising a plurality of devices, or to an apparatus comprising a simple device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A character recognition method for executing a plurality of character recognition processes in parallel, each process accessing a common storage medium that stores standard character patterns and receiving an address for accessing the common storage medium from a common counter, comprising the steps of:

instructing the start of each character recognition process one after another at a predetermined interval; and incrementing the address value of the common counter in a cyclic manner in accordance with the progress of character recognition by the plurality of character recognition processes, and each character recognition process comprising the steps of:

inputting a segmented character pattern;

setting an initial access address value in a register, based on a current value indicated in the common counter, at a time when a character recognition process starts in accordance with said instructing step;

reading the standard character pattern from the common storage medium, based on the initial access address value;

comparing the input segmented character pattern and the read standard character pattern;

repeating the steps of:

inputting an address value currently indicated in the common counter for accessing a standard character pattern stored in the common storage medium;

comparing the input address value and the initial access address value stored in the register;

reading the standard character pattern from the common storage medium, based on the input address value;

comparing the input segmented character pattern and the read standard character pattern until the input address value coincides with the initial access address value stored in the register so as to perform recognition of the input segmented character pattern; and outputting a character recognized in accordance with the character pattern recognized in the recognition.

2. The method according to claim 1, further comprising resetting a pointer, indicating the address of the character pattern, to a reading start address of the storage medium when the address of the standard character pattern read from the common storage medium reaches a reading end address.

3. A character recognition apparatus including a plurality of concurrently executable processing means for performing character recognition, common storage means for storing standard character patterns that are shared by said plurality of processing means and common counting means for providing an address for accessing the common storage means, comprising:

instruction means for instructing the start of each character recognition processing means one after another at a predetermined interval; and incrementing means for incrementing the address value of the common counting means in a cyclic manner in accordance with the progress of character recognition by the plurality of processing means; and processing means comprising:

character pattern input means for inputting a segmented character pattern into said processing means;

pointer set means for setting an initial access address value, based on a current value indicated by the common counting means, at a time when said processing means starts the character recognition processing in accordance with said instruction means instructing the start of each character recognition processing means;

initial read means for reading a standard character pattern from the common storage means, based on the initial access address value;

initial compare means for comparing the input segmented character pattern and the read standard character pattern by said initial read means;

access address value input means for inputting an address value currently indicated by the common counting means for accessing another character pattern stored in the common storage means;

access address comparing means for comparing the address value input by said access address value input means and the initial access address value stored by said pointer storage means;

reading means for reading the standard character patterns from the common storage means, based on the input address value;

character pattern comparison means for comparing the input segmented character pattern and the standard character patterns read from the common storage means by said reading means;

control means for controlling recognition of the input segmented character pattern by repeating the function of said access address value input means, said access address comparing means, said reading means and said character pattern comparison means until the input access address value coincides with the initial access address value stored by said pointer storage means; and output means for outputting a character recognized in accordance with the character pattern recognized by said character pattern comparison means.

4. The apparatus according to claim 3, wherein said plurality of processing means respectively comprise access control means for controlling access to said common storage means in order to avoid an access conflict from said plurality of processing means to said common storage means.

5. The apparatus according to claim 3, wherein the number of said plurality of processing means is equal to or more than a value determined by dividing a period of time required to recognize one character pattern by a time interval of inputting one character pattern.

6. The apparatus according to claim 3, wherein the comparison performed by said initial compare means and said character pattern comparison means includes calculation of similarity between the character pattern input by said input means and the standard character patterns.

7. The apparatus according to claim 3, wherein the standard character patterns include numerals, alphabets, Chinese characters, and Japanese characters.

8. The apparatus according to claim 3, wherein said plurality of processing means respectively operate in accordance with the same calculation algorithm.

9. The apparatus according to claim 3, wherein said plurality of processing means respectively operate in accordance with different calculation algorithms.

10. The apparatus according to claim 3, wherein pattern data of the respective standard character pattern are stored in continuous areas in said common storage means.

11. A character recognition apparatus including a plurality of concurrently executable processing means for performing character recognition, and common storage means for storing standard character patterns that are shared by said plurality of processing means, comprising:

common counting means for providing an address for accessing the common storage means;

instruction means for instructing the start of each processing means one after another at a predetermined interval; and incrementing means for incrementing the address value of the common counting means in a cyclic manner in accordance with the progress of character recognition by the plurality of processing means, and each processing means comprising:

character pattern input means for inputting a segmented character pattern into said processing means;

initial value set means for setting the number of standard character patterns stored in said common storage means;

initial read means for reading a standard character pattern from the common storage means, based on a current value indicated by the common counting means, at a time when said processing means starts the character recognition processing in accordance with said instruction means instructing the start of each processing means;

initial compare means for comparing the input segmented character pattern and the read standard character pattern by said initial read means;

access address value input means for inputting an address value currently indicated by the common counting means for accessing another character pattern stored in the common storage means;

reading means for reading the standard character patterns from the common storage means, based on the input address value;

decrement means for decrementing the number of the standard character patterns set by said initial value set means each time a reading out of the standard character pattern occurs;

character pattern comparison means for comparing the input segmented character pattern and the standard character patterns read from the common storage means by said reading means;

control means for controlling recognition of the input segmented character pattern by repeating the function of said access address value input means, said access address comparing means, said reading means and said character pattern comparison means until the number of the standard character patterns decremented by said decrement means becomes zero; and output means for outputting a character recognized in accordance with the character pattern recognized by said character pattern comparison means.

* * * * *

UNITED STATES PATENT AND TRADEMARK OFFICE
CERTIFICATE OF CORRECTION

PATENT NO. : 5,465,305

DATED : November 7, 1995

INVENTOR : Shugoro Ueno

It is certified that error appears in the above-identified patent and that said Letters Patent is hereby corrected as shown below:

COVER PAGE

Under [56] References Cited, Foreign Patent Documents,
   "115174  4/1980  Japan should be deleted and
   "2173699  7/1990  Japan
    3149961  7/1991  Japan" should read
   --2-173699  7/1990  Japan
     3-149961  7/1991   Japan --.

Under [54], "PREPARING" should read --PERFORMING--.

COLUMN 1

Line 2, "PREPARING" should read --PERFORMING--.

COLUMN 2

Line 43, "of" should read --on--.

Signed and Sealed this

Twenty-fifth Day of June, 1996

Attest:

BRUCE LEHMAN

*Attesting Officer*        *Commissioner of Patents and Trademarks*